United States Patent [19]
Payen

[11] 3,749,858
[45] July 31, 1973

[54] DEVICE FOR CURRENT COLLECTING WITH SEPARATE CONTACT SHOES

[75] Inventor: Jean-Pol Payen, Grenoble, France

[73] Assignee: Merlin Gerin, Societe Anonyme, Grenoble, France

[22] Filed: Jan. 11, 1971

[21] Appl. No.: 105,591

[52] U.S. Cl. .............................. 191/45 R, 191/59.1
[51] Int. Cl. ................................................ B60l 5/00
[58] Field of Search ................... 191/49, 55, 50, 22, 191/23, 33, 45 R, 45 A, 59.1

[56] References Cited
UNITED STATES PATENTS

| | | | |
|---|---|---|---|
| 2,918,540 | 12/1959 | Mayer | 191/59.1 |
| 3,624,318 | 11/1971 | Rekers | 191/45 A |
| 3,610,844 | 10/1971 | Blanchard | 191/45 |
| 3,124,226 | 3/1964 | Sprigings | 191/59.1 |

Primary Examiner—Gerald M. Forlenza
Assistant Examiner—Richard A. Bertsch
Attorney—Stevens, Davis, Miller & Mosher

[57] ABSTRACT

Current collecting device with shoes maintained in contact with feed rails wherein the contact surface is dihedral in shape to assure centering of the shoes with respect to the rails. Each shoe is divided into a pair of independent elements, each carrying one of the faces of the dihedral, to maintain contact with the rail by lateral decentering.

5 Claims, 3 Drawing Figures

PATENTED JUL 31 1973  3,749,858

DEVICE FOR CURRENT COLLECTING WITH SEPARATE CONTACT SHOES

This invention, relates to a device for current collecting by a vehicle traveling at high speed along a predetermined course, including a current pick-up track consisting of fixed feed conductors in the form of rails, with which current collecting parts cooperate by friction, the current collectors are carried by a mobile member in the form of a collector head which travels along the current collecting track and is guided by the current collecting parts; the contact surfaces of the current collectors are dihedral in shape and are housed in a dihedral surface conjugate with the associated rail, the ridges of the dihedrals extend in the longitudinal direction of the rail in such a manner as to assure self-centering of the current-collecting part and the supporting collector head with relation to the rail during displacement.

The applicant has already proposed, more particularly in the U. S. Pat. application Ser. No. 78,413, filed Oct. 6, 1970, a current-collecting device of the kind mentioned, permitting the feeding of electric current to the motor of a vehicle traveling at high speed, for example at several hundred kilometers an hour. At high speed, the rough places or irregularities in the track communicate impulses to the current-collecting part or brush, tending to make the part glide above the surface, breaking mechanical and electrical contact. This breaking of contact is accompanied by arcs which cause wear on the shoes and contact surfaces of the rails.

The present invention has as its purpose the overcoming of these difficulties and permits the realization of a current-collecting device by which the shoes are maintained in permanent contact with the associated rails at all speeds of travel.

The current collecting device according to the invention is characterized by the fact that the current-collecting parts are each divided longitudinally into a pair of symmetrical independent elements, each carrying one of the faces of the dihedral which constitutes the contact surface of the current-collecting part and which impels each fractional element by elastic means, each independent from the other, to contact the rail.

By dividing the contact parts or shoes into parts, their relative mass is decreased, and their characteristics of oscillation or rebounding permits them to follow irregularities of the contact surface. In case of slight decentering of the shoe with relation to the rail, each of the fractional elements remains in contact with the dihedral surface of the rail and maintains perfect electrical contact.

The feed conductors in rail form can likewise present an interval between the contact surfaces in the manner described in the aforementioned application for patent. In this case the intercalary wall between the two half-shoes is advantageously prolonged in such a way as to make the contact surface on the shoes project and to penetrate into the interval prepared in the rail to perform the function of ice-breaker or rail-sweeper. This projection can likewise serve as a spare guiding finger capable of detering derailment of the collector head.

Other advantages and characteristics of the invention will arise from the following description of a method for placing the invention in operation by way of a non-restrictive example represented by the attached drawing, in which.

The current-collecting track is of the kind more particularly described in the application for patent aforementioned and consists of three conductors in the form of elongated rails, 12, 12' and 12", which extend along the course of travel of a vehicle (not shown), for example a vehicle of the type supported by ground effect. A current-collecting head 14, bearing the current-collecting parts or shoes 16, 16' and 16" is capable of traveling along the current-collecting track 10, being guided mechanically by shoes 16, 16' and 16" in mechanical and electrical contact with the associated rails 12, 12' and 12".

Figure 1:
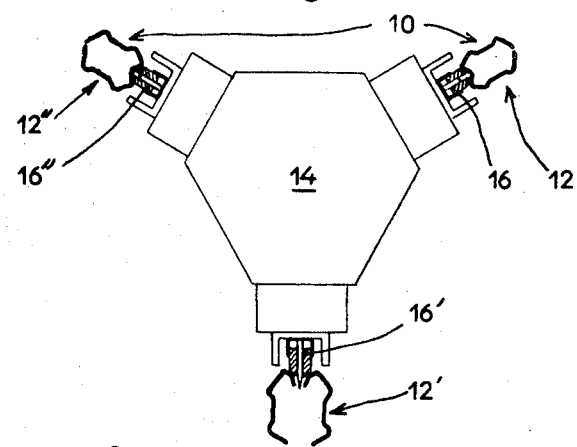
FIG. 1 is a cross-section view of a current collecting track according to the invention.
Figure 2:
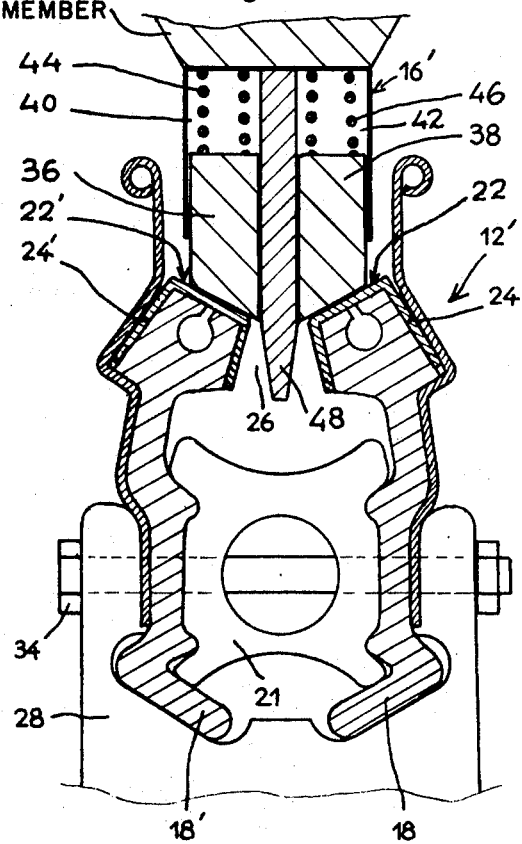
FIG. 2 is a cross-section view in large scale of a conductor in the form of a rail and of the associated current-collecting part according to FIG. 1.

There will be described now, with reference to FIG. 2, one of the conductors of track 10, for example conductor 12'; the other conductors 12 and 12" may be identical or, on occasion, in the manner shown in FIG. 1, the dihedral contact rails may be without interval to the right of the ridge. Conductor 12' consists of an assemblage of identical sections 18 and 18', arranged symmetrically opposite each other and braced by keys inserted between the two sections. The assembly is set in supports 28 by draw bolts 34. The contact surfaces 22 and 22' of each profile 18 and 18' are sheathed by coatings of stainless steel 24 and 24' and extend along the surfaces of a dihedral with its concavity oriented toward the current-collecting piece 16'. The median part of dihedral 22 and 22' is grooved in such a way as to form an interval 26 separating the two contact faces 22 and 22'.

Two half-shoes 36 and 38 are each housed in a casing 40 and 42, and are each subject to the action of a compression spring 44 and 46, permitting the half-shoes 36 and 38 to contact the surface of the associated rail 22' and 22. The median wall 48 of the guiding casing 40 and 42 extend in the direction of the rail 12' and project from the contact surface of the two half-shoes 36 and 38, in such a way as to penetrate the space 26 arranged between the two sections 18 and 18'. The collector shoe formed by the two elements 36 and 38 presents a contact surface in dihedral or in V shape which fits into the surface which is sectioned into dihedral contact surfaces 22 and 22' of rail 12'.

The contact shoe elements 36 and 38 slide independently of each other in their respective casings 40 and 42 and their reduced mass permits them to follow immediately the irregularities of the route and to maintain permanent perfect electrical and mechanical contact. In the case of slight lateral decentration, elements 36 and 38 are induced to take a position which is slightly displaced with relation to each other, but each of the elements remains in contact with the feed rail 12'. It is easy to understand that a single shoe cast in one piece would be impelled to separate from one of the dihedral surfaces in case of such a lateral lag.

The part of median wall 48 inserted in space 26 with clearance could in addition perform the function of emergency guidance capable of taking charge of the guidance of collector head 14 in case of excessive lateral clearance.

Figure 3:
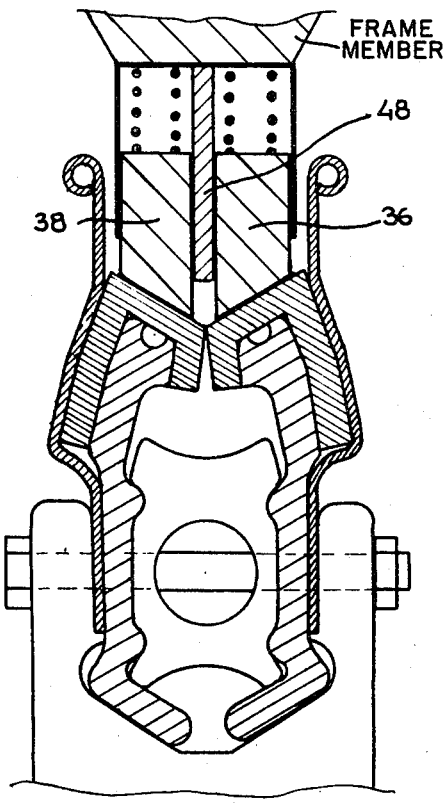
FIG. 3 is a view analogous to FIG. 2, illustrating a variation in the operation of the invention, including a rail at the contact surface without interruption.

The fractional shoes 36 and 38 can of course be used in association with the feed rails, the contact surface of which does not present any discontinuity as is shown in FIG. 3. In this case the length of the median will 48 is diminished in such a way as to avoid any projection to the exterior.

The invention is not limited at all, of course, to the manner of operation described in detail and represented in the attached drawing, but it extends to all variants within the framework of mechanical and electrical equivalents, especially those in which the rail will be of different conformation, for example, formed by an entire sectional bar.

What is claimed is:

1. A current collector adapted for movement along a longitudinally extending current supplying rail defining a dihedral contact surface, said collector comprising a frame member, at least one pair of contact shoes symmetrically arranged with respect to the bisecting plane of said dihedral contact surface and spaced apart substantially perpendicularly to said plane, each contact shoe having a single plane contact surface, the contact surfaces of said pair being adapted for sliding contact engagement with the plane of said dihedral contact surface, respectively, guide means on said frame member to guide said contact shoes of said pair towards and away from said rail substantially perpendicularly thereto, and a plurality of resilient contact shoe biasing means, one for each contact shoe, whereby each biasing means biases the corresponding contact shoe against said rail independently of the operation of the other biasing means.

2. A current collector according to claim 1, said guide means guiding said contact shoes parallelly to said bisecting plane.

3. A current collector according to claim 2, said planes of said dihedral contact surface having spaced apart confronting edges, said guide means comprising a partition wall extending in said bisecting plane and having a knife-shaped free end portion protruding between said edges.

4. An electrical distribution and current collecting assembly for use in high speed drive arrangements, comprising:

a rail type stationary conductor having a pair of juxtaposed parallelly extending profile strips of conducting material, each having an outer and an opposed inner surface, the latter defining together a dihedral contact surface;

at least one pair of contact shoes symmetrically arranged on either side of the bisecting plane of said dihedral contact surface, the contact surfaces of said shoes together forming a dihedral surface which conforms to the dihedral surface of said stationary conductor;

a plurality of resilient contact shoe biasing means, one for each contact shoe, whereby each biasing means biases the corresponding contact shoe against the corresponding one of said pair of profile strips independently of the operation of the other biasing means; and guide means for guiding said contact shoes in a direction of movement towards and away from the dihedral surface of said stationary conductor and substantially parallel to the bisecting plane thereof.

5. An assembly according to claim 4, wherein said profile strips are spaced apart to define a longitudinally extending gap between the faces of the dihedral contact surfaces thereof, said guide means comprising a partition wall between said pair of contact shoes and extending through the gap between said profile strips for guiding the contact shoe assembly and limiting lateral movement thereof.

* * * * *